United States Patent
Funari et al.

(10) Patent No.: US 10,189,194 B2
(45) Date of Patent: Jan. 29, 2019

(54) UNITARY DIAPHRAGM

(71) Applicant: Zurn Industries, LLC, Milwaukee, WI (US)

(72) Inventors: Michael A. Funari, Apex, NC (US); Robert E. Saadi, Erie, PA (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 14/952,194

(22) Filed: Nov. 25, 2015

(65) Prior Publication Data

US 2016/0161010 A1    Jun. 9, 2016

Related U.S. Application Data

(60) Provisional application No. 62/088,236, filed on Dec. 5, 2014.

(51) Int. Cl.

| | |
|---|---|
| *F16K 31/12* | (2006.01) |
| *B29C 45/16* | (2006.01) |
| *E03D 3/06* | (2006.01) |
| *B29K 21/00* | (2006.01) |
| *B29K 55/02* | (2006.01) |

(52) U.S. Cl.
CPC ............ *B29C 45/1676* (2013.01); *E03D 3/06* (2013.01); *B29K 2021/003* (2013.01); *B29K 2055/02* (2013.01)

(58) Field of Classification Search
CPC ............... F16K 31/3855; F16K 31/383; B29C 45/1676; B29K 2055/00; B29K 2021/0032; E03D 3/06

USPC ................................ 251/40; 92/103 F, 103 M
See application file for complete search history.

(56) References Cited

U.S. PATENT DOCUMENTS

| | | | | |
|---|---|---|---|---|
| 4,817,913 | A * | 4/1989 | Whiteside | E03D 3/06 138/40 |
| 5,232,194 | A * | 8/1993 | Saadi | E03D 3/06 251/120 |
| 5,271,600 | A * | 12/1993 | Saadi | E03D 3/06 251/120 |
| 5,560,981 | A † | 10/1996 | Ito | |
| 6,913,239 | B2 † | 7/2005 | Nortier | |
| 7,487,950 | B2 † | 2/2009 | Johnson | |
| 7,980,528 | B2 † | 7/2011 | Wilson | |
| 8,016,262 | B2 * | 9/2011 | Maercovich | F16K 31/05 251/129.03 |
| 8,485,221 | B2 † | 7/2013 | O'Connor | |
| 8,596,607 | B2 * | 12/2013 | Maercovich | F16K 31/05 251/129.03 |
| 9,057,452 | B2 * | 6/2015 | Maercovich | E03D 3/06 |
| 9,115,487 | B2 * | 8/2015 | Maercovich | E03D 5/10 |

(Continued)

*Primary Examiner* — Umashankar Venkatesan
(74) *Attorney, Agent, or Firm* — Quarles & Brady LLP

(57) ABSTRACT

Disclosed are systems and methods for a unitary diaphragm assembly is for use in flush valves. The diaphragm assembly may have a flexible diaphragm which includes a seating portion and a mounting portion at the outer peripheral edge. A flow ring may be positioned adjacent to the seating portion of the diaphragm. An elongated barrel member may extend from the diaphragm in a longitudinal direction and may include a plurality of radial supports positioned circumferentially around the outer surface of the barrel member and along a portion of the length of the barrel member.

18 Claims, 4 Drawing Sheets

(56) References Cited

U.S. PATENT DOCUMENTS

2006/0068206 A1† 3/2006 Hala
2014/0231692 A1 8/2014 Funari et al.

\* cited by examiner
† cited by third party

UNITARY DIAPHRAGM

CROSS-REFERENCE TO RELATED APPLICATION

This application claims priority to U.S. Provisional Patent Application No. 62/088,236 filed Dec. 5, 2014, the contents of which are hereby incorporated by reference for all purposes as if set forth in their entirety herein.

STATEMENT OF FEDERALLY SPONSORED RESEARCH OR DEVELOPMENT

Not applicable.

BACKGROUND

This disclosure relates, in general, to improvements in flush valves for toilets, urinals, and other plumbing equipment. More particularly, this disclosure relates to an improved diaphragm for use in flush valves.

Flush valves in toilets, urinals, and other plumbing devices may utilize a flexible diaphragm to both establish and seal off the connection between the inlet and outlet within a hollow brass body. In some flush valves, a barrel forms the connection between the inlet and outlet and the top of the barrel may include an annular main valve seat. This main valve atop the barrel may be normally closed by a flexible diaphragm which may extend across the hollow body of the flush valve and define an upper chamber. The flexible diaphragm may be clamped in place by an annular clamping rim on the flush valve body. The center of the flexible diaphragm may connect the upper chamber with the outlet, and a relief valve may be located in the center of the flexible diaphragm to normally seal off the upper chamber from the outlet.

Diaphragm assemblies may include the diaphragm, a relief valve, a stem, a guide member, wing members, a retaining disc, and a flow ring. The guide member in the barrel may move with the diaphragm and include outwardly extending radial wing members, which engage the inner surface of the barrel to guide the guide member and attached diaphragm. The guide member may be attached to the diaphragm with a retaining disc using brass threading. The diaphragm may be formed of rubber which may be bonded to the brass parts in order obtain acceptable seating surfaces.

In general, a normally closed flush valve may operate to seal off the upper chamber from the outlet using the water pressure from the inlet. The water under pressure at the inlet may communicate with the upper chamber of the flush valve through a bypass in the flexible diaphragm. Since the upper side of the diaphragm has a greater surface area, the water pressure forces the diaphragm down onto the valve seat on top of the barrel, thus preventing water from flowing into the outlet from the upper chamber. When a user moves a handle of the flush valve, a plunger may move inwardly toward the axis of the barrel and tilt a stem of the relief valve. This may break the seal the relief valve has established and allow water to flow through a guide member within the barrel and to the outlet. The opening of the relief valve may relieve the pressure within the upper chamber and the water pressure from the inlet may force the diaphragm upward and off of the main valve seat, allowing water to flow from the inlet through the barrel to the outlet. When moving upward, the diaphragm may reset the relief valve located in its center such that it again seals off the upper chamber from the outlet. Water from the inlet may then flow through the bypass into the upper chamber until the diaphragm is again forced against main valve seat, thereby closing the valve.

SUMMARY

According to one aspect, a one-piece unitary diaphragm assembly for use in a flush valve is disclosed. The one-piece unitary diaphragm assembly includes an elongated barrel member, an annular flexible diaphragm, a radial support, and a relief valve seat. Constructed of a first predetermined material, the elongated barrel member has a body defining a passageway and the annular flexible diaphragm disposed about it. Constructed of a second predetermined material different from the first, the annular flexible diaphragm has a mounting portion at its peripheral edge for mounting the diaphragm assembly within the flush valve. Extending along some longitudinal length of the barrel member, the radial support is positioned circumferentially around the outer surface of the barrel member. The relief valve seat is located at the upper end of the barrel member and adapted for receiving a relief valve. In some forms, the assembly may further include a relief valve having a stem with a sealing member disposed at its upper end. The lower surface of the sealing member may have a sealing material disposed it, adapted for sealing against said relief valve seat.

According to another aspect, a flush valve diaphragm kit for use in a flush valve is disclosed. The diaphragm kit includes a one-piece unitary diaphragm assembly, an annular flexible diaphragm, a radial support, relief valve seat, and a relief valve, which are all arranged and constructed as described above.

The assembly and the kit may vary in form. In some forms, a flow control ring may be positioned about the barrel member and configured to be supported by the radial support. In some forms, a bypass orifice may be disposed through the annular flexible diaphragm.

According to yet another aspect, a method of molding a one-piece unitary diaphragm assembly is disclosed. The method includes first, heating a first thermoplastic material until molten, and then delivering the first molten thermoplastic material to a mold's first cavity having an elongated tube shape. The method then includes heating a second thermoplastic material until molten, and delivering the second molten thermoplastic material to the mold's second cavity, having an annular shape and fluidly communicating with the first cavity. The next step in the method is holding the first and second thermoplastic materials in the mold for a predetermined period of time to form a one-piece unitary diaphragm, and finally, ejecting the one-piece unitary diaphragm from the mold. In some forms, the first and second cavities may fluidly communicate at an interface between the exterior of the elongated tube shape and the interior of the annular shape. In other forms, the exterior of the elongated tube shape may fluidly communicate with a ring-shaped third cavity positioned about the elongated tube shape via a radial passage, which may be configured to form a radial support. The radial support may be configured to support a flow control ring formed from the ring-shaped third cavity.

The first and second predetermined materials forming an integral unitary diaphragm assembly may vary according to different forms. In some forms, the first and second predetermined materials may be co-formed. In other forms, the second predetermined material may be overmolded onto the first. In some forms, the first and second predetermined materials may be different thermoplastics. In other forms, the first and second predetermined materials may be acrylonitrile butadiene styrene (ABS) and a thermoplastic elastomer (TPE).

There are many potential benefits of a one-piece unitary diaphragm assembly as described herein. A one-piece unitary diaphragm assembly may control the flow parameters of a flush valve which may flush, rinse, and refill toilets and urinals in a consistent, quiet, quick and effective manner. A diaphragm assembly may be designed as a unitary diaphragm molded from thermoplastic and thermoplastic elastomer resins. Using thermoplastic elastomer materials for a diaphragm assembly may combine the compressibility and sealing characteristics of rubber with the moldable and rigid structural characteristics of plastic, which may meet and exceed the performance required in flush valves. A unitary diaphragm assembly may be interchangeable with older multi-part diaphragm assemblies used in common valve assemblies, flush valves, and flushometer valves. The unitary diaphragm design of the disclosure may improve the consistency, reliability, and expected life of the diaphragm unit by reducing the number of parts and eliminating parts which cause undesirable wear and corrosion. The unitary diaphragm assembly may extend the life of the product by preventing both the separation of the diaphragm tab from the diaphragm rubber and the creation of rubber particles which may clog parts of the assembly, including the bypass. A unitary diaphragm may allow for reduced unit costs due to a decrease in part manufacturing costs and the elimination of assembly costs. A unitary diaphragm may allow for improved control of tolerances which may result in improved performance valve to valve, as well as reduced part scrappage. Finally, lower inventory costs may result due to a reduction in the total number of parts for a unitary diaphragm design.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
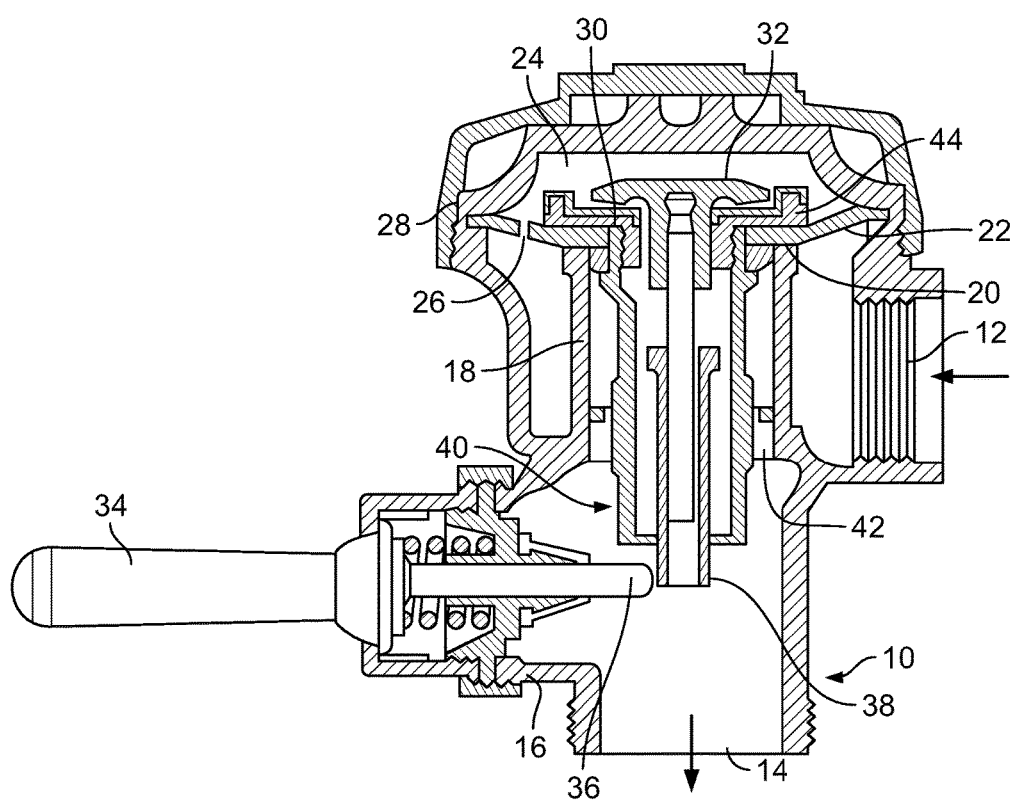
FIG. 1 shows an example of a common flush valve assembly.

FIG. 1 shows an example of a flush valve and diaphragm assembly. This type of flush valve may have a hollow body 10, generally made of brass, which may include an inlet 12, an outlet 14, and a handle connection 16. A barrel 18 may be located within the flush valve such that the connection between inlet 12 and outlet 14 is through the barrel 18. An annular main valve seat 20 may be formed on the top of the barrel 18. The annular main valve seat 20 may be normally closed by the diaphragm 22 which may extend across the hollow body 10 and define an upper chamber 24. The diaphragm 22 may have a bypass 26 which provides fluid communication between the inlet side of the flush valve and the upper chamber 24. The diaphragm 22 may be attached at its outer edge to the valve body and may be clamped in place by an annular clamping rim on the outer cover 28 of body 10. The center of the diaphragm 22 may have an opening 30 which allows for fluid communication between upper chamber 24 and the outlet 14. A relief valve 32 may normally close the opening 30 at the center of the diaphragm 22.

In general, a normally closed flush valve may operate to seal off the upper chamber 24 from the outlet using the water pressure from the inlet 12. The water under pressure at the inlet 12 may communicate with the upper chamber 24 of the flush valve through a bypass 26 in the flexible diaphragm. Since the upper side of the diaphragm 22 may have a greater surface area, the water pressure from the inlet 12 may force the diaphragm 22 down onto the valve seat 20 on top of the barrel 18, thus preventing water from flowing into the outlet 14 from the upper chamber 24. When a user actuates a handle 34 of the flush valve, a plunger 36 may move inwardly toward the axis of the barrel 18 and tilt a stem 38 of the relief valve 32. This may break the seal the relief valve 32 has established and allow water to flow through a guide member 40 within the barrel 18 and through to the outlet 14. The opening of the relief valve 32 may relieve the pressure within the upper chamber 24 and the water pressure from the inlet 12 may force the diaphragm 22 upward and off of the main valve seat 20, allowing water to flow from the inlet 12 through the barrel 18 to the outlet 14. When moving upward, the diaphragm 22 may reset the relief valve 32 located in its center such that the relief valve 32 may again seal off the upper chamber 24 from the outlet 14. Water from the inlet 12 may then flow through the bypass 26 into the upper chamber 24 until the diaphragm 22 is again forced against main valve seat 20, thereby closing the valve.

The guide member 40 may move with the diaphragm 22 and may include outwardly extending radial wing members 42. The radial wing members may engage the inner surface of the barrel 18 to guide the guide member 40 and attached diaphragm 22 as the diaphragm 22 moves up and down.

Figure 2:
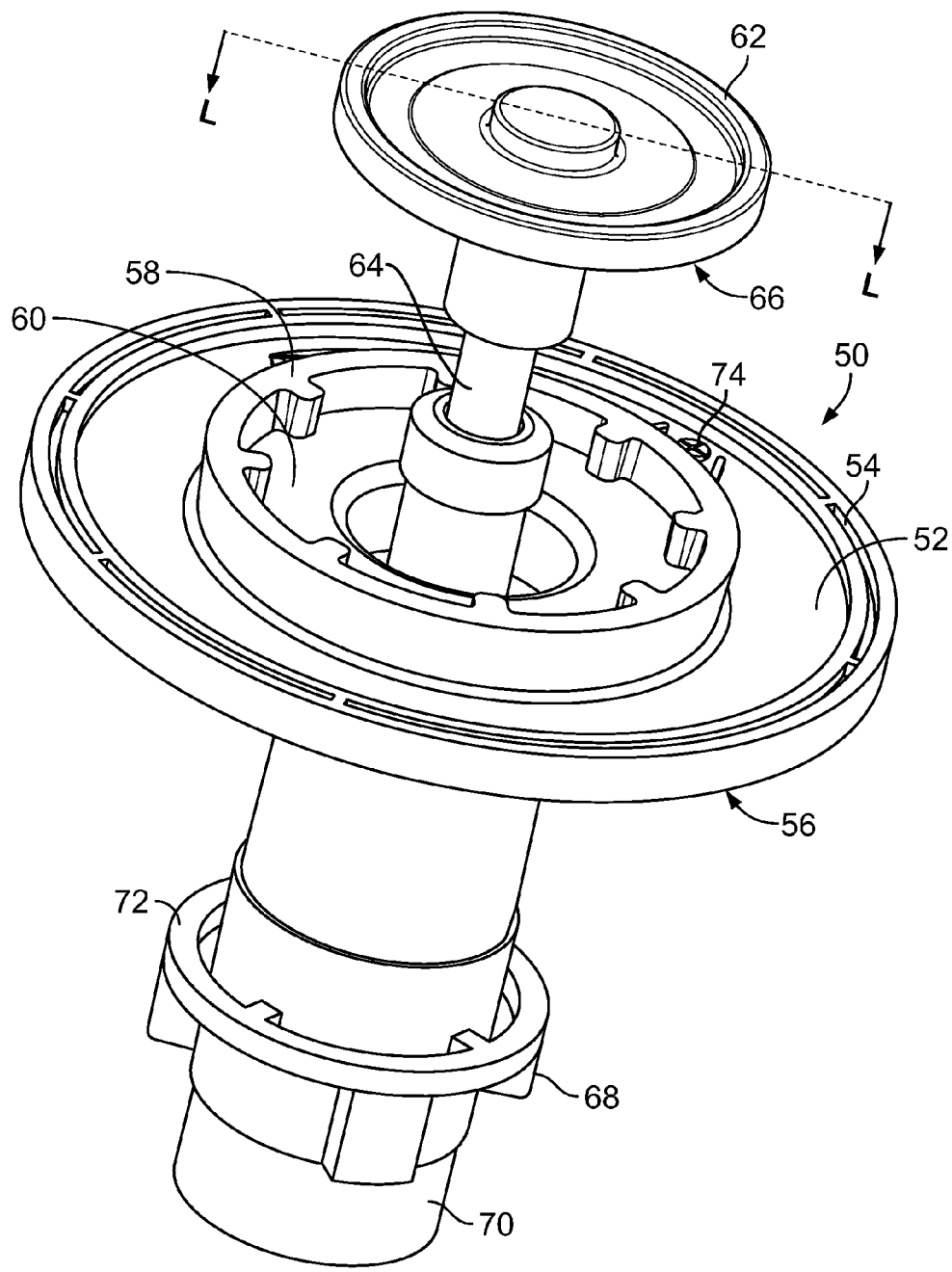
FIG. 2 shows a perspective view of an example of a unitary diaphragm assembly design and a relief valve extending through the center of the diaphragm assembly.

FIG. 2 shows an example of a unitary diaphragm assembly 50 which may be designed to be utilized in flush valves of the type illustrated in FIG. 1, which may replace the complicated diaphragm assemblies of older devices. The unitary diaphragm assembly 50 may be molded as a single piece from a thermoplastic and a thermoplastic elastomer. The unitary diaphragm assembly 50 may include an integral diaphragm 52 which has a mounting portion 54 at the outer peripheral edge.

Figure 3:
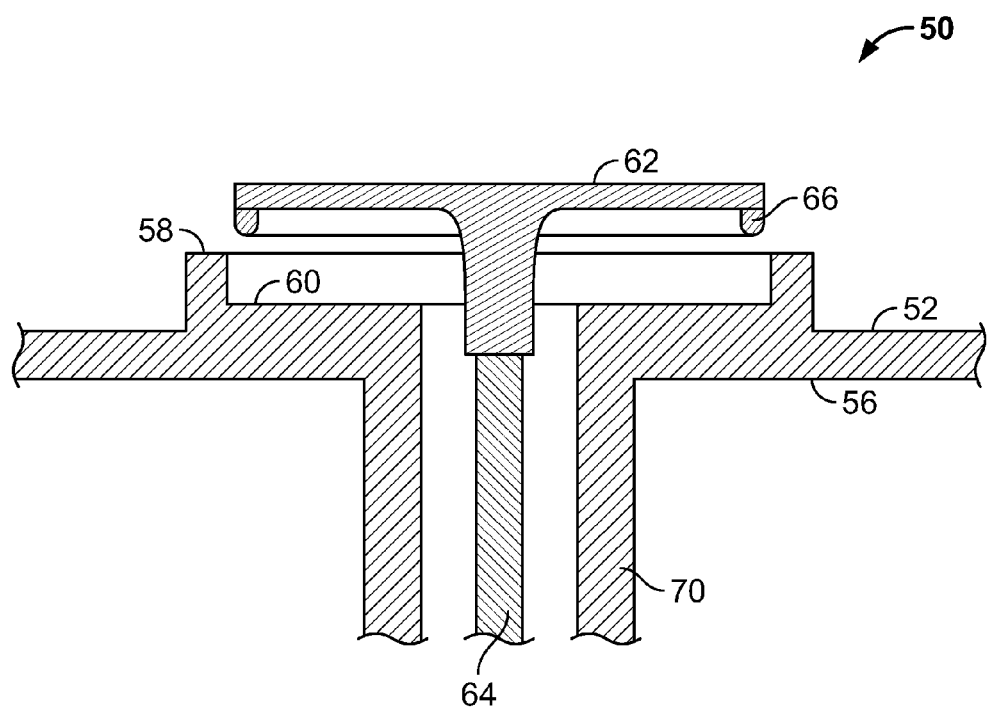
FIG. 3 shows a cross sectional view of another example unitary diaphragm assembly as it would be seen along line L-L of the assembly of FIG. 2 with the sealing relief valve in an open position.
Figure 4:
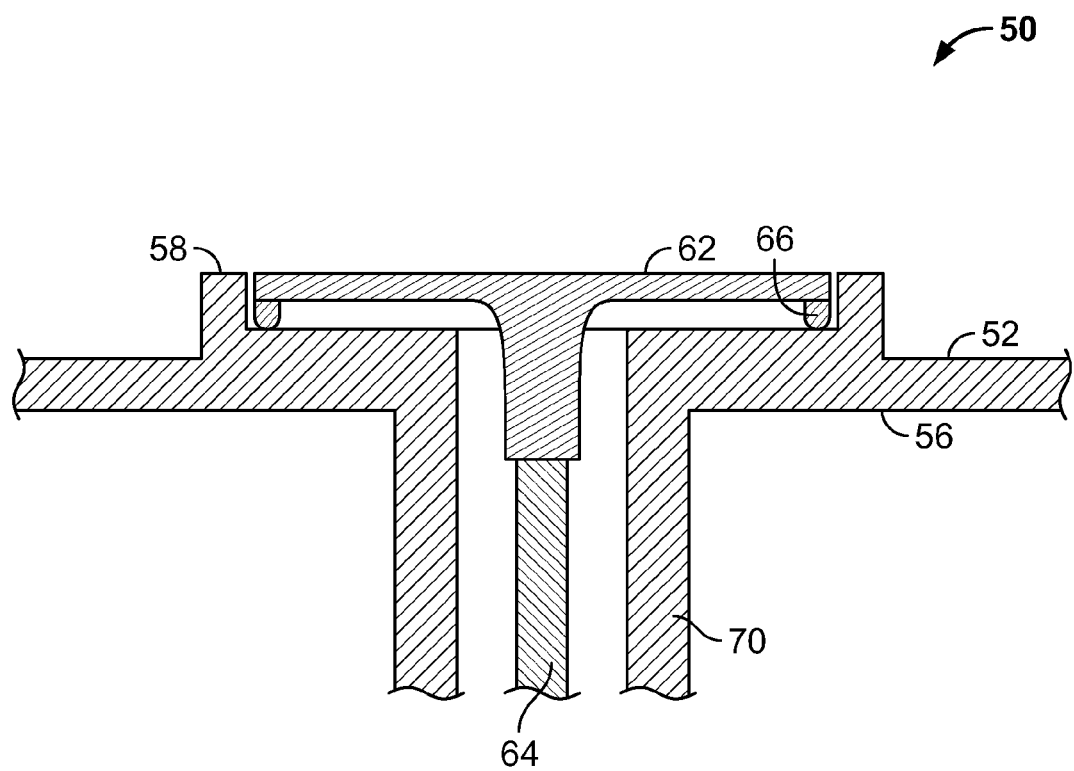
FIG. 4 shows a cross sectional view of the unitary diaphragm assembly of FIG. 3 with the sealing relief valve in a closed position.

Referring to FIGS. 2-4, a sealing surface 56 may be located on the underside of the integral diaphragm 52 at a position radially inward relative to integral diaphragm 52, so as to cooperate with the main valve seat 20 of a flush valve. An integral retaining disc 58 may extend upward from the diaphragm 52 above the portion of the diaphragm 52 having the sealing surface 56. The retaining disc 58 may include a relief valve seat 60, which may be configured to receive a sealing relief valve 62. The sealing relief valve 62 may include a valve stem 64 projecting downward and a sealing material 66 disposed on the underside of the sealing relief valve 62. The sealing material 66 may form an annular lip configured to establish a seal with the relief valve seat 60. Alternatively, the sealing material 66 may cover the entire underside of the sealing relief valve 62 rather than only an annular lip. Radial supports 68 may extend from a barrel member 70 to support a flow ring 72 and to maintain the diaphragm assembly 50 in the proper alignment as it moves up and down inside the barrel 18.

The relief valve seat 60 may be positioned on the upper end of barrel member 70. The barrel member 70 may cooperate with the barrel 18 of a flush valve and may extend substantially coaxially along the length of the barrel 18. The flow ring 72 may control the flow of water when the diaphragm assembly 50 is in the open position.

The unitary diaphragm assembly 50 may also include a bypass orifice 74 positioned within the diaphragm 52. The unitary diaphragm assembly 50 may operate in an analogous manner to the diaphragm assembly of FIG. 1.

The unitary diaphragm assembly 50 may be molded as a single piece from a thermoplastic and a thermoplastic elastomer via plastic injection molding. The two materials may be co-molded according to known techniques. Alternatively, a first material may be overmolded onto a second material to construct the unitary diaphragm assembly 50. As an example, the barrel member 70, retaining disc 58, radial supports 68, and flow ring 72 may be molded from a thermoplastic, such as acrylonitrile butadiene styrene (ABS), and the integral diaphragm 52 may be overmolded or co-molded from a thermoplastic elastomer to the thermoplastic making up the barrel member 70, integral retaining disc 58, radial supports 68, and flow ring 72. In this way, the unitary diaphragm assembly 50 may be constructed as a single piece from two different materials.

The unitary diaphragm assembly 50 may be constructed from more than two different thermoplastic materials by using multi-shot plastic injection molding methods, where different parts may be constructed from different materials. As an example, the barrel member 70, radial supports 68, and flow ring 72 may be molded from a thermoplastic, such as acrylonitrile butadiene styrene (ABS). While the retaining disc 58 and the diaphragm 52 may be overmolded or co-molded from a first thermoplastic elastomer and a second thermoplastic elastomer, respectively, to the thermoplastic of the barrel member 70, radial supports 68, and flow ring 72. In this way, the unitary diaphragm assembly 50 may be constructed as a single piece from three different materials.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A one-piece unitary diaphragm assembly for use in a flush valve, the assembly comprising:
    an elongated barrel member having a body defining a passageway;
    an annular flexible diaphragm disposed about the elongated barrel member, and a mounting portion at the peripheral edge of the annular flexible diaphragm for mounting said diaphragm assembly within the flush valve;
    a radial support positioned circumferentially around the outer surface of said barrel member and extending along at least a portion of the longitudinal length of said barrel member;
    a relief valve seat at the upper end of said elongated barrel member, said relief valve seat adapted for receiving a relief valve; and
    a relief valve having a stem and a sealing member disposed at an upper end of said stem, in which a sealing material is disposed on a lower surface of the sealing member adapted for sealing against said relief valve seat;
    wherein the sealing material is an annular lip on the lower surface of the sealing member;
    wherein the elongated barrel member is constructed of a first predetermined material; and
    wherein the annular flexible diaphragm is constructed of a second predetermined material different from the first predetermined material.

2. The one-piece unitary diaphragm assembly of claim 1, wherein the first predetermined material and the second predetermined material are co-formed.

3. The one-piece unitary diaphragm assembly of claim 1, wherein the second predetermined material is overmolded onto the first predetermined material.

4. The one-piece unitary diaphragm assembly of claim 1, further comprising a flow control ring positioned about the elongated barrel member, wherein said radial support is configured to support the flow control ring.

5. The one-piece unitary diaphragm assembly of claim 1, further comprising a bypass orifice disposed through said annular flexible diaphragm.

6. The one-piece unitary diaphragm assembly of claim 1, wherein the first predetermined material is a thermoplastic and the second predetermined material is a different thermoplastic.

7. The one-piece unitary diaphragm assembly of claim 1, wherein the first predetermined material is an acrylonitrile butadiene styrene (ABS) and the second predetermined material is a thermoplastic elastomer (TPE).

8. A flush valve diaphragm kit for use in a flush valve, the kit comprising:
    a one-piece unitary diaphragm assembly having an elongated barrel member having a body defining a passageway;
    an annular flexible diaphragm disposed about the elongated barrel member, and a mounting portion at the peripheral edge of the annular flexible diaphragm for mounting said diaphragm assembly within a flush valve;
    a radial support positioned circumferentially around the outer surface of said barrel member and extending along at least a portion of the longitudinal length of said barrel member;
    a relief valve seat at the upper end of said elongated barrel member, said relief valve seat being adapted for receiving a relief valve;
    wherein the elongated barrel member is constructed of a first predetermined material;
    wherein the annular flexible diaphragm is constructed of a second predetermined material; and
    further comprising a relief valve having a stem and a sealing member disposed at an upper end of said stem, wherein a sealing material is disposed on a lower surface of the sealing member adapted for sealing against said relief valve seat;
    wherein the sealing material is an annular lip on the lower surface of the sealing member.

9. The flush valve diaphragm kit of claim 8, wherein the first predetermined material and the second predetermined material are co-formed.

10. The flush valve diaphragm kit of claim 8, wherein the second predetermined material is overmolded onto the first predetermined material.

11. The flush valve diaphragm kit of claim 8, further comprising a flow control ring positioned about the elongated barrel member, wherein said radial support is configured to support the flow control ring.

12. The flush valve diaphragm kit of claim 8, further comprising a bypass orifice disposed through said annular flexible diaphragm.

13. The flush valve diaphragm kit of claim 8, wherein the first predetermined material is a thermoplastic and the second predetermined material is a different thermoplastic.

14. The flush valve diaphragm kit of claim 8, wherein the first predetermined material is an acrylonitrile butadiene styrene (ABS) and the second predetermined material is a thermoplastic elastomer (TPE).

15. The one-piece unitary diaphragm assembly of claim 1, wherein the annular lip of sealing material is positioned adjacent an outer surface of the sealing member.

16. The flush valve diaphragm kit of claim 8, wherein the sealing material extends circumferentially about a portion of the lower surface of the sealing member.

17. The flush valve diaphragm kit of claim 16, wherein the sealing material is positioned substantially concentrically with an outer surface of the sealing member.

18. The flush valve diaphragm kit of claim 17, wherein the sealing material is positioned tangential to the outer surface of the sealing member.

* * * * *